Sept. 5, 1967 D. W. DODGE 3,339,263
HAND-OPERATED HYDRAULIC PULLER WITH READILY
REMOVABLE AND CAMMED PULLING LEVERS
Filed Jan. 9, 1967 2 Sheets-Sheet 1
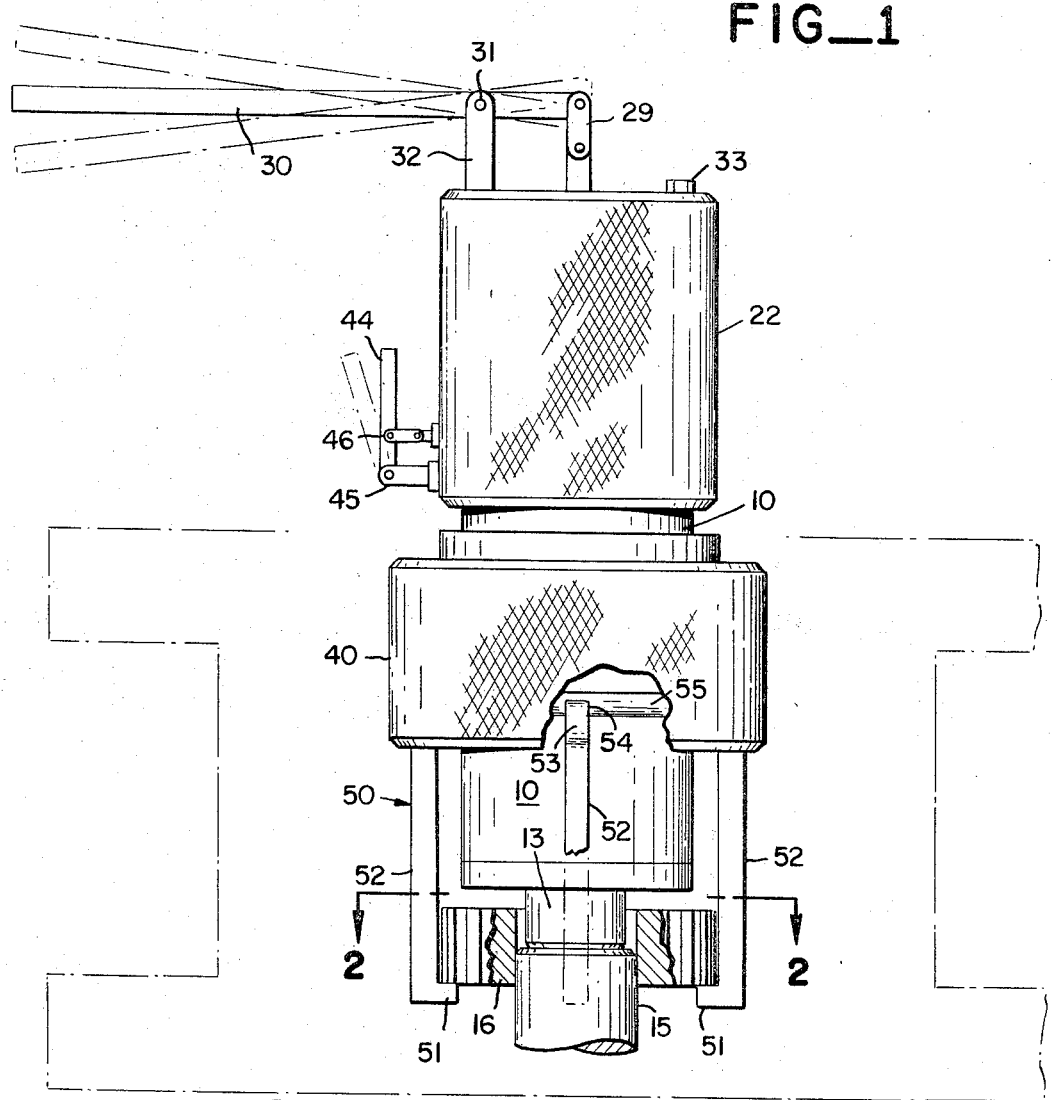
FIG_1
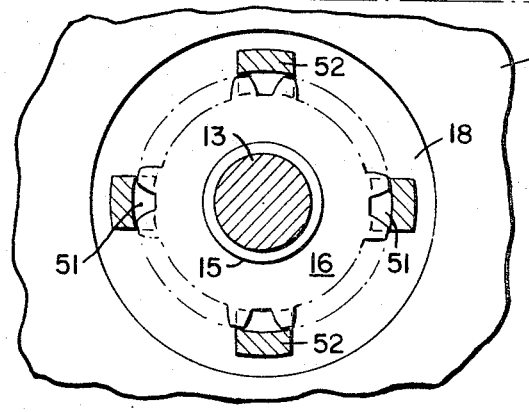
FIG_2
INVENTOR.
DARWIN W. DODGE
BY
Owen, Wickersham & Erickson
ATTORNEYS

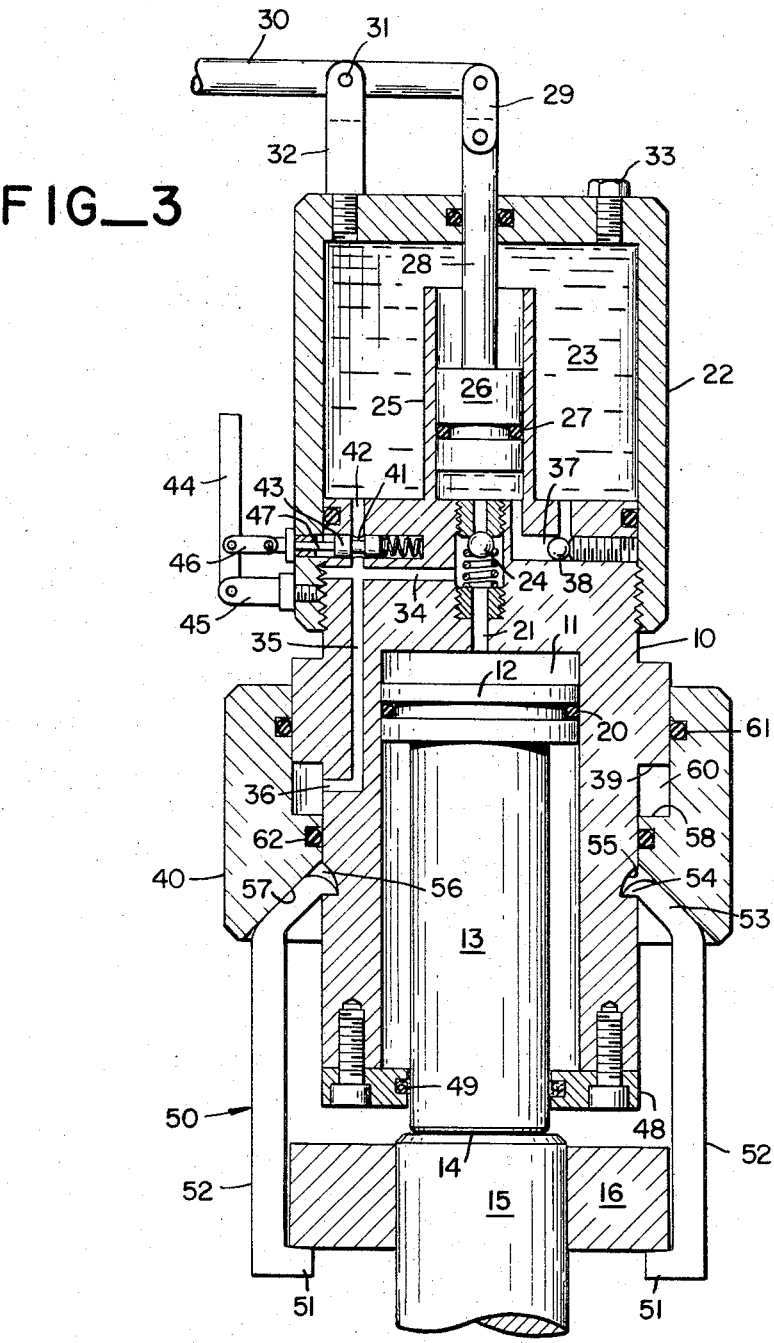

United States Patent Office 3,339,263
Patented Sept. 5, 1967

3,339,263
HAND-OPERATED HYDRAULIC PULLER WITH READILY REMOVABLE AND CAMMED PULLING LEVERS
Darwin W. Dodge, 2401 Fair Drive, Napa, Calif. 94558
Filed Jan. 9, 1967, Ser. No. 608,109
6 Claims. (Cl. 29—252)

ABSTRACT OF THE DISCLOSURE

This hydraulic puller has a series of readily detachable generally axially extending gripper arms having a cam portion at one end terminating in dog-like ends and inwardly extending fingers at the other end for gripping the member to be pulled. The fingers fit in a recess in the housing which provides the main cylinder and oil reservoir and holds the main piston. A collet member having a lower frustoconical face engages the cam portion of the gripper arms to swing their fingers radially inwardly. The collet preferably has a chamber for hydraulic fluids and seal means bearing against said housing, and a passage in the housing communicates with this collet chamber so as to lock said collet in place hydraulically during operation of the device, while firmly forcing the gripper arms down.

---

This application is a continuation-in-part of application Ser. No. 518,972, filed Dec. 30, 1965, now abandoned.

This invention relates to an improved hand-operated hydraulic pulling device with readily removable and cammed pulling levers.

There are many situations in which it is necessary to exert a strong straight pull within a limited space. As one example, on many diesel engines repair work at times necessitates pulling out the gears from the pump drive of the air compressor for the injection pump. The clearance space around the gears is quite small, for they are enclosed in a housing not much larger in diameter than the gears themselves; so it is difficult to get equipment down to the gears involved and then to pull them off their shaft. So far as I am aware, no hydraulic pulling device has heretofore been able to operate satisfactorily within such small clearance spaces, to give a straight pull of the gears off the shaft; moreover, most pulling devices have tended to mar or break the gears because the pull has been exerted largely on the very edges of the gear teeth. This one example illustrates the need, the problem, and the importance of having a satisfactory device.

The invention provides a hand-pump-operated hydraulic unit. The main piston has an extension rod which bears against a shaft end or casing or other member which is to remain stationary, and the hydraulic fluid pushes the cylinder and other parts of the pulling device away from this stationary member, to exert a pulling force on a set of gripper arms. An important feature is that the gripper arms are readily detachable from the unit to enable their insertion separately in a small space and can then quickly be reconnected to the unit. Another significant feature is that of a collet which has a cammed or wedging edge that forces the gripper arms to swing their outer ends in and thereby exert their pull on loci inwardly of the periphery of the object being pulled. This inward movement of the gripper arm ends takes place at the beginning of the operation of the unit, and is followed by a strong axial pull. The collet may be hydraulically held in place or locked, while pushing the gripper arm down.

Other objects and advantages of the invention will appear from the following description of a preferred form of the invention.

In the drawings:
FIG. 1 is a view in elevation of an hydraulic pulling device embodying the principles of the invention. The handle is shown in solid lines in its stationary non-operating position and in broken lines in its extreme positions during pumping, and the pressure release lever is shown in solid lines in its normal position and in broken lines in its pressure-release position. A portion of the device is broken away and shown in section and a portion of the collet is broken away to show one of the gripper arms.
FIG. 2 is a view in section taken along the line 2—2 in FIG. 1.
FIG. 3 is a view in elevation and in section, on an enlarged scale compared with FIG. 1, of the device in installed and pre-operating position.
FIG. 4 is a fragmentary view of a portion of FIG. 3 showing one gripper arm in its final pulling position.

A main housing member 10 provides a cylinder 11 in which moves a piston 12 having an axial extension rod 13 with an end 14 which rests on some object which is to remain stationary during the pulling operation, for example, a shaft 15 on which is mounted a gear 16 that is to be removed. The shaft 15 and gear 16 are mounted inside a housing 17 with a small clearance 18 around the gear 16.

The piston 12 may be provided with a suitable piston ring, such as an O-ring 20 fitting in a suitable groove. The housing member 10 is provided with an inlet passage 21 for hydraulic fluid leading into the cylinder 11. A hollow casing 22 may be connected to the housing 10, as by being threaded to the upper portion of the housing 10, and this casing 22 provides an oil storage chamber or reservoir 23 for the hydraulic fluid. The chamber 23 is connected to the passage 21 via a spring-and-ball check valve 24 which is opened by pressure above it and is closed after a charge has been pumped into the passage 21.

Inside the chamber 23 is a pump cylinder 25 in which a piston 26 is moved for pumping hydraulic fluid through the valve 24. The piston 26 may have an O-ring 27 and an extension rod 28 leading out through the casing 22 and connected by a pivot 29 to a pump handle 30. The pump handle 30 is pivoted at 31 to a stationary support member 32. A removable plug 33 enables filling the chamber 23 with a suitable hydraulic fluid. Hence, by pumping the handle 30, a man can force hydraulic fluid from the cylinder 25 through the valve 24 and the passage 21 into the cylinder 11 to displace the piston 12. Pumping the handle 30 also draws in hydraulic fluid from the reservoir 23 to the cylinder 25 via a passage 37 and check valve 38.

The same pumping action also sends hydraulic fluid into a secondary passage 34 and thence by a passage 35 (smaller than the passage 21) to a port 36 by a step 39 in the housing, facing a collet 40. The secondary passage 34 also leads to a return or relief valve 41 in a passage 42 normally closed by a spring-urged spool valve 43, which is opened by a hand-operated lever 44 that is pivoted to an anchor fitting 45 which projects out from the casing 10 and is connected by a pivoting link 46 to a plunger 47 for the valve 43. Pressing the lever 44 inwardly releases the pressure on the piston 12, returns the hydraulic fluid to the chamber 23, and readies the unit for another operation.

An end plate 48 at the bottom of the casing 10 provides dust seal and aligning guide 49 for the rod 13, keeping it straight and clean.

A series of removable and replaceable gripping arms or pulling levers 50 is provided, each arm being generally L-shaped with a pulling finger 51 at its lower end to grip the gear 16 to be pulled and having a long generally axially extending portion 52 to set them for the correct distance. (Sets of arms 50 with portions 52 of different lengths may be provided.) The upper portions of arms 50 have an angular portion 53, preferably extending at about 45° and dog-like ends 54 which are engaged in a recess 55 provided in the housing 10, the recess 55 not only providing a ledge but having clearance spaces 56 enabling the ends 54 to be rotated. The dogs 54 can be placed anywhere along the recess to obtain whatever disposition is desired, and the number of arms 50 used can easily be varied. The collet 40 is provided with a cam-like lower end having a frustoconical face 57 that engages the portions 53 and, when the collet 40 is moved downwardly, forces the arms 50 to swing their fingers 51 inwardly as the ends 54 pivot in the recesses 55. The collet 40 has a step or shoulder 58 facing the shoulder 39, so that a cavity 60 lies between them, sealed by O-rings 61 and 62. When the pump applies hydraulic pressure to the cavity 60, the collet 40 is forced down and exerts a downward force on the arms 50, also providing a hydraulic lock to hold the arms 50 in place.

In operation the gripper arms 50 are detached from the unit, and their fingers are inserted in the housing 17 to a point just beneath the gear 16; then the arms 50 are attached to the unit by insertion of the dogs 54 in the recesses 55 while the collet 40 is held up. The collet 40 is then moved down against the portions 53, causing the arms 50 to swing in their fingers 51 and grab the gear 16 radially in from the edge of the gear teeth; the handle 30 is then pumped to cause the piston extension end 14 to bear against the shaft 15. The fluid also enters the cavity 60, urges the collet 40 downwardly, and locks the collet 40 in place. Further movement of the piston 12 (by the pump) causes the assembly to move relatively to the shafts 15, and as a result the fingers 51 pull the gear 16 off the shaft 15 by a direct axial pull, without damage to the edges of the gear 16. As a result, the pulling is safe and is accomplished in a very small space.

To those skilled in the art to which this invention relates, many changes in construction and widely differing embodiments and applications of the inveniton will suggest themselves without departing from the spirit and scope of the invention. The disclosures and the description herein are purely illustrative and not intended to be in any sense limiting.

I claim:
1. An hydraulic pulling device for exerting a strong force on a member to be pulled relatively to a stationary member, including in combination
 a housing providing a main cylinder, an oil reservoir, and a passageway connecting said reservoir to said cylinder,
 a check valve in said passageway,
 a main piston in said main cylinder, having an extension adapted to bear against said stationary member during pulling,
 pump means for forcing hydraulic fluid from said reservoir into said cylinder via said check valve,
 release means for eturning hydraulic fluid from the cylinder to the reservoir after completion of the pulling operation,
 said housing having recess means around its outer periphery adjacent the lower end thereof,
 a series of readily detachable gripper arms having axially extending portions with a cam portion at one end terminating in dog-like ends engageable in said recess means and inwardly extending fingers at the other end of said axially extending portion for gripping said member to be pulled, and
 a collet member having a lower frustoconical face adapted to engage against said cam portions of said gripper arms to hold said ends thereof in said recess means and to force the griper arms to swing their fingers radially inwardly.

2. The device of claim 1 wherein said collet and said housing are formed to provide a chamber for hydraulic fluids, with seal means therefor, said housing having a passage communicating with said pump means via said check valve so as to urge said collet downwardly and to lock said arms in place hydraulically during operation of the device.

3. The device of claim 1 wherein said cam portion extends at an angle of about 45° to said axially extending portion, and said frustoconical face lies at about the same angle.

4. The device of claim 1 wherein said housing has a guide and dust seal means at its lower end in contact with said extension of said piston.

5. In an hydraulic pulling device for engaging a member to be pulled relatively to a stationary member, said device having a housing providing a main cylinder and an oil reservoir, a main piston in said main cylinder, having an extension adapted to bear against said stationary member during pulling, pump means for forcing hydraulic fluid from the reservoir into the cylinder, and release means for returning hydraulic fluid from the cylinder to the reservoir after completion of the pulling operation, the combination therewith of:
 said housing having a recess around its outer periphery adjacent the lower end thereof with a ledge thereon,
 a series of readily detachable gripper arms having axially extending portions, an angular portion at one end terminating in dog-like ends engageable on said ledge in said recess, and L-shaped lower fingers at the other end of said axially extending portion and extending radially in to grip said member to be pulled, and
 a collet having a lower frustoconical face adapted to engage the angular portion of the gripper arms to swing their fingers radially inwardly.

6. The combination of claim 5 wherein said collet and housing cooperate to provide a chamber for hydraulic fluids, and means for sending hydraulic fluid from said pump means to said chamber so as to urge said collet against said gripper arms and hold them in place during operation of the device.

References Cited

UNITED STATES PATENTS

| 1,777,616 | 10/1930 | Hommel | 29—252 |
| 2,003,648 | 6/1935 | Frye et al. | 29—252 |
| 2,003,756 | 6/1935 | Nagel | 29—252 |
| 2,490,284 | 12/1949 | Simart | 29—252 X |
| 2,789,342 | 4/1957 | Pouell | 29—252 |
| 3,069,761 | 12/1962 | Sommer | 29—252 |

FOREIGN PATENTS

| 1,010,918 | 6/1957 | Germany. |
| 581,381 | 8/1958 | Italy. |

WILLIAM FELDMAN, *Primary Examiner.*

MYRON C. KRUSE, *Assistant Examiner.*